(12) United States Patent
Ocher et al.

(10) Patent No.: US 12,737,197 B2
(45) Date of Patent: Sep. 15, 2026

(54) PERFORMANCE OPTIMIZATIONS FOR DATA OPERATIONS

(71) Applicant: SAP SE, Walldorf (DE)

(72) Inventors: Alexander Ocher, San Jose, CA (US); Sreenivasulu Gelle, San Ramon, CA (US); Manali Pise, Sunnyvale, CA (US)

(73) Assignee: SAP SE, Walldorf (DE)

( * ) Notice: Subject to any disclaimer, the term of this patent is extended or adjusted under 35 U.S.C. 154(b) by 491 days.

(21) Appl. No.: 18/469,690

(22) Filed: Sep. 19, 2023

(65) Prior Publication Data

US 2025/0094183 A1 Mar. 20, 2025

(51) Int. Cl.

*G06F 16/00* (2019.01)
*G06F 9/448* (2018.01)
*G06F 16/2455* (2019.01)

(52) U.S. Cl.

CPC ........ *G06F 9/448* (2018.02); *G06F 16/24561* (2019.01)

(58) Field of Classification Search

CPC ................................................ G06F 16/24561
See application file for complete search history.

(56) References Cited

U.S. PATENT DOCUMENTS

2021/0117172 A1* 4/2021 Gopinathan Nair ...... G06F 8/60

* cited by examiner

*Primary Examiner* — Ajith Jacob
(74) *Attorney, Agent, or Firm* — Buckley, Maschoff & Talwalkar LLC

(57) ABSTRACT

Embodiments may be associated with a data source and a data service tool. A performance optimizer may determine a new type of data job to be executed based on a job execution parameter, perform a first execution of the new type of data job (such that data operations are performed at the data service tool), and collect first performance results. The performance optimizer then performs a second execution of the new type of data job (such that data operations are pushed down and performed at the data source) and collects second performance results. The first and second performance results are compared, and a result storage is updated with an indication of whether subsequent executions of the new type of data job will perform data operations at the data service tool or at the data source. The indication stored in the result storage may comprise, for example, a pushdown flag.

17 Claims, 12 Drawing Sheets

| DATA JOB TYPE 1002 | CPU USAGE 1004 | MEMORY UTILIZATION 1006 | PUSHDOWN FLAG 1008 |
|---|---|---|---|
| T_101 | | | FALSE |
| T_102 | | | TRUE |
| T_103 | | | TRUE |
| T_104 | | | FALSE |

PERFORMANCE OPTIMIZATIONS FOR DATA OPERATIONS

BACKGROUND

Systems may involve a data service tool, such as an Extract, Transform, Load ("ETL") tool (e.g., SAP® data services), that retrieve information from a data source (e.g., a database). For example, FIG. 1 is a system 100 that includes a data service tool 120 that requests information at (A) and receives the information from a data source 110 at (B). In some cases, one or more data operations 122 may then be performed by the data service tool 120. For example, the data operations 122 may be associated with a sort, a search, a replace, an arithmetic operation, a data join, etc. In another approach, the data operations may instead be "pushed down" from the data service tool 120 to the data source 110. For example, FIG. 2 is a system 200 that uses a pushdown approach for data operations 212. Here, a data service tool 220 requests information at (A) and receives the information from a data service source 210 at (B) with the data operations 212 already having been performed.

However, in most cases, it is not possible to predict which approach will be more efficient (that is the pushdown to the data source versus performing the data operation in the data service tool). This may be true even with systems that utilize indexes—not to mention those associated with general data reading. It would therefore be helpful to have a mechanism to help determine which approach results in the best performance. Of course, when it is known (for example, if reading can be done using a cluster index), then may be no need to use such benchmarking.

Note that benchmarking may be even more helpful when used with database-based applications, such as the SAP® Enterprise Resource Planning ("ERP") application, which do their own processing for database data (e.g., by using cluster and/or pool tables). These special objects are not mapped to the physical tables in the underlying database, cannot have indexes, and as a result their reading is even more unpredictable.

Systems are desired to help optimize the performance of various types of data jobs and data operations.

SUMMARY

According to some embodiments, methods and systems may include a data source and a data service tool. A performance optimizer may determine a new type of data job to be executed based on a job execution parameter, perform a first execution of the new type of data job (such that data operations are performed at the data service tool), and collect first performance results. The performance optimizer then performs a second execution of the new type of data job (such that data operations are pushed down and performed at the data source) and collects second performance results. The first and second performance results are compared, and a result storage is updated with an indication of whether subsequent executions of the new type of data job will perform data operations at the data service tool or at the data source. The indication stored in the result storage may comprise, for example, a pushdown flag.

Some embodiments comprise: means for determining, by a computer processor of a performance optimizer, a new type of data job to be executed (based on a job execution parameter) in connection with a data source and a data service tool; means for performing a first execution of the new type of data job, such that data operations are performed at the data service tool, and collecting first performance results; means for performing a second execution of the new type of data job, such that data operations are pushed down and performed at the data source, and collecting second performance results; means for comparing the first and second performance results; and means for updating a result storage with an indication of whether subsequent executions of the new type of data job will perform data operations at the data service tool or at the data source.

Some technical advantages of some embodiments disclosed herein are improved systems and methods to optimize performance of various types of data jobs in an efficient and accurate manner.

DETAILED DESCRIPTION

Briefly, some embodiments help optimize the performance of various types of data jobs and data operations. In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
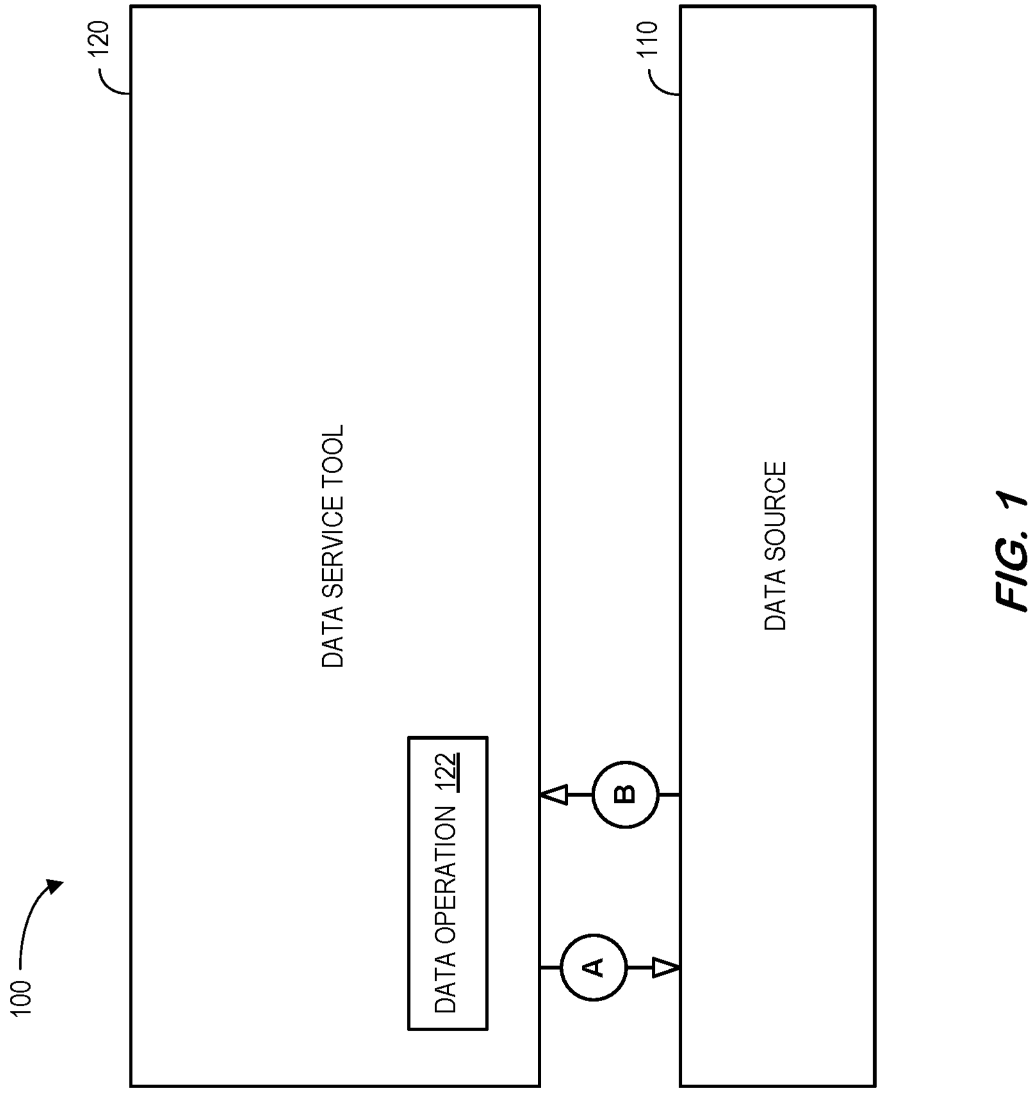
FIG. 1 is a system including a data source and a data service tool.
Figure 2:
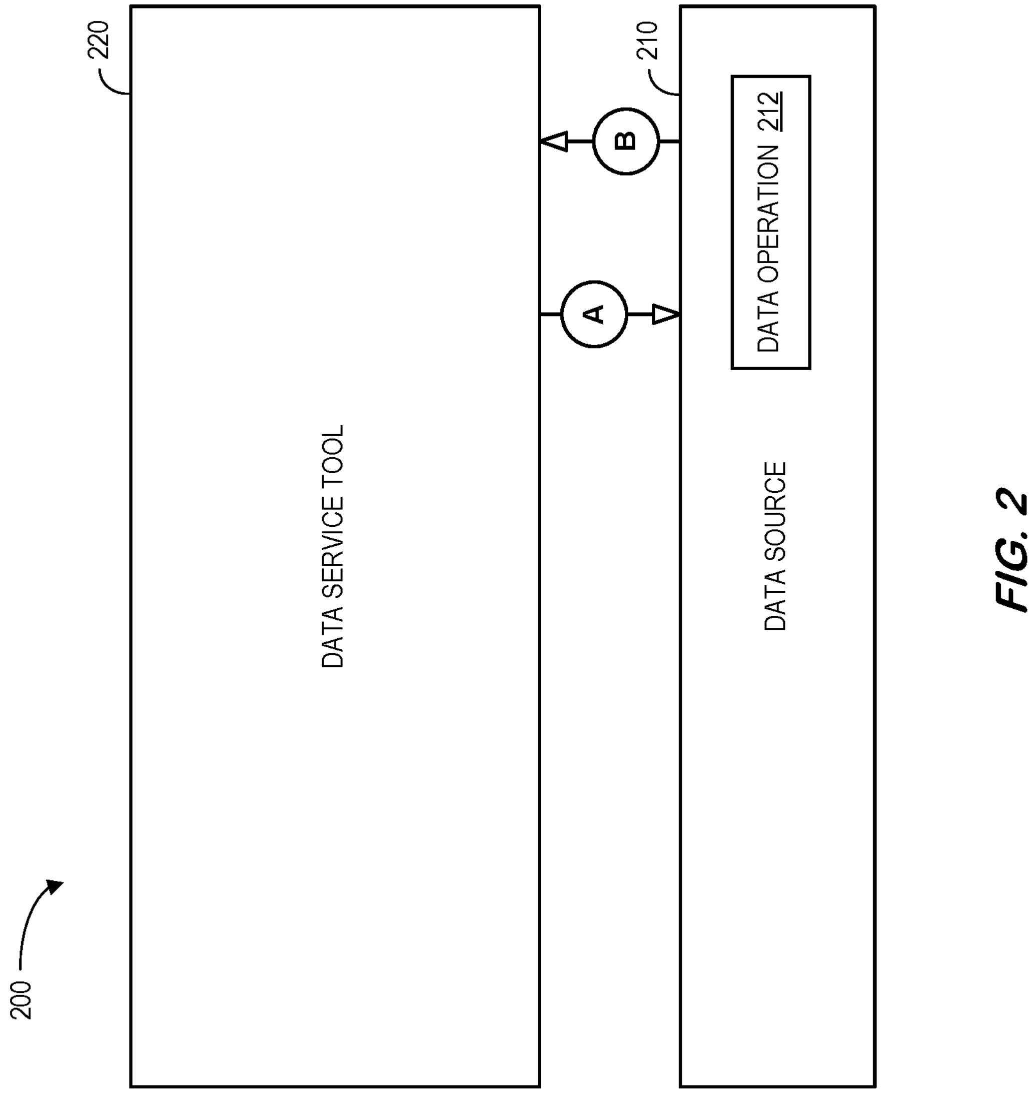
FIG. 2 is a system that uses a pushdown approach for data operations.
Figure 3:
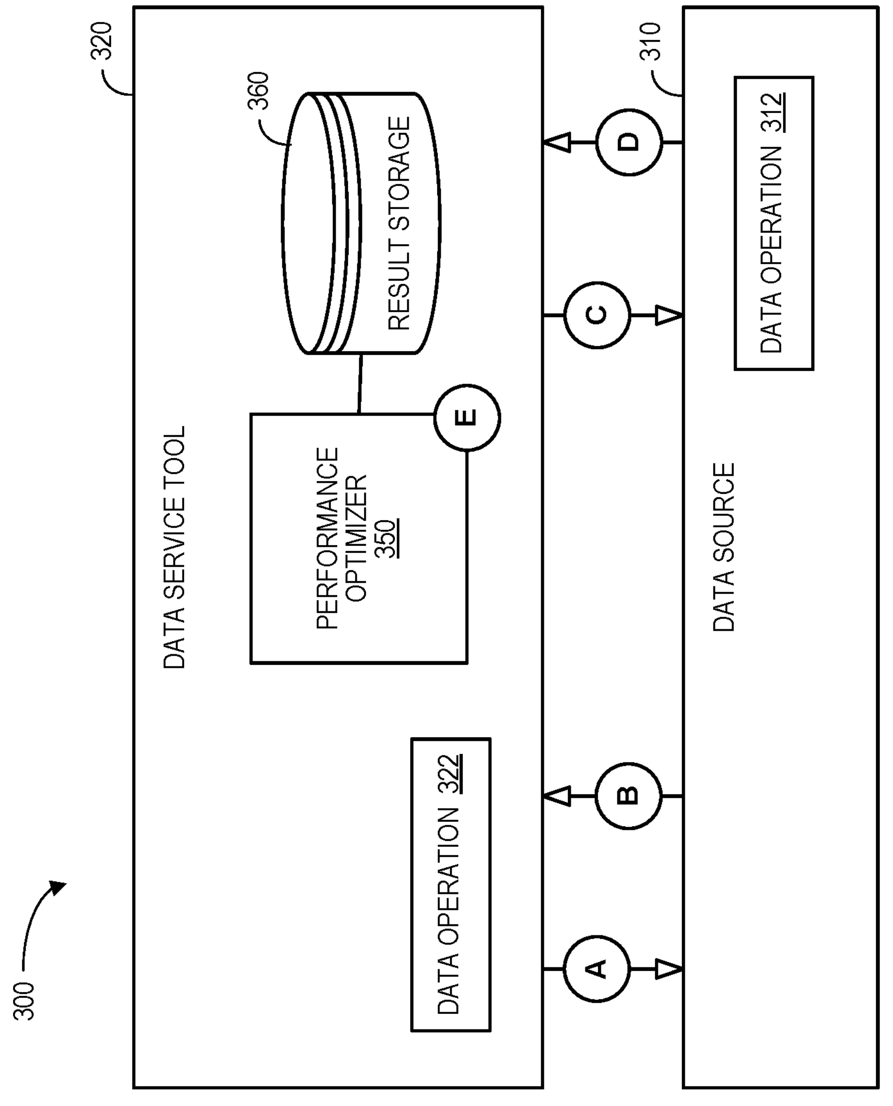
FIG. 3 is a high-level block diagram of a system in accordance with some embodiments.

FIG. 3 is a high-level block diagram of a system 300 in accordance with some embodiments. The system 300 includes a data source 310 coupled to a data service tool 320. Moreover, a performance optimizer 350 is coupled to a result storage 360. The performance optimizer 350 and the result storage 360 may be part of or separate from the data service tool 320. According to some embodiments, devices, including those associated with the system 300 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 300 may store data into and/or retrieve data from various data stores (e.g., result storage 360), which may be locally stored or reside remote from the performance optimizer 350. Although a single performance optimizer 350 is shown in FIG. 3, any number of such devices may be included. Moreover, various devices described herein might be combined according to embodiments of the present invention. For example, in some embodiments, the performance optimizer 350 and the result storage 360 might comprise a single component or apparatus. Some or all of the system 300 functions may be performed by a constellation of networked apparatuses, such as in a distributed processing or cloud-based architecture.

An operator (e.g., a database administrator) may access the system 600 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various optimization parameters) and/or provide or receive automatically generated recommendations, results, and/or alerts from the system 600.

According to some embodiments, the same job may be used to perform testing and determine the most efficient execution option. The job is executed twice, once at (A) and (B) while performing a data operation 322 at the data service tool 320 (e.g., an ETL tool), and once at (C) and (D) with the data operation 312 being pushed down to the data source 310. To do this, each operation 312, 322 may have the associated code in the data service tool 320 to perform it both ways. This benchmark run takes longer, but it provides a fair comparison and determines the best method. This information can then be stored in the result storage 360 and may be set in a repository for future use with this data source 310. If data source 310 caching is possible, then a double read for no pushdown may be used followed by a double read with pushdown.

To do this determination of pushdown/no pushdown, a special flag maybe used when running the job. Examples of operations that can be benchmarked are a sort, search/replace, arithmetic operations, etc. Getting CPU/memory usage from the data source 310 and/or the data service tool 320 can further improve the optimal pushdown location by providing more granular details about the advantages/disadvantages of each approach.

Figure 4:
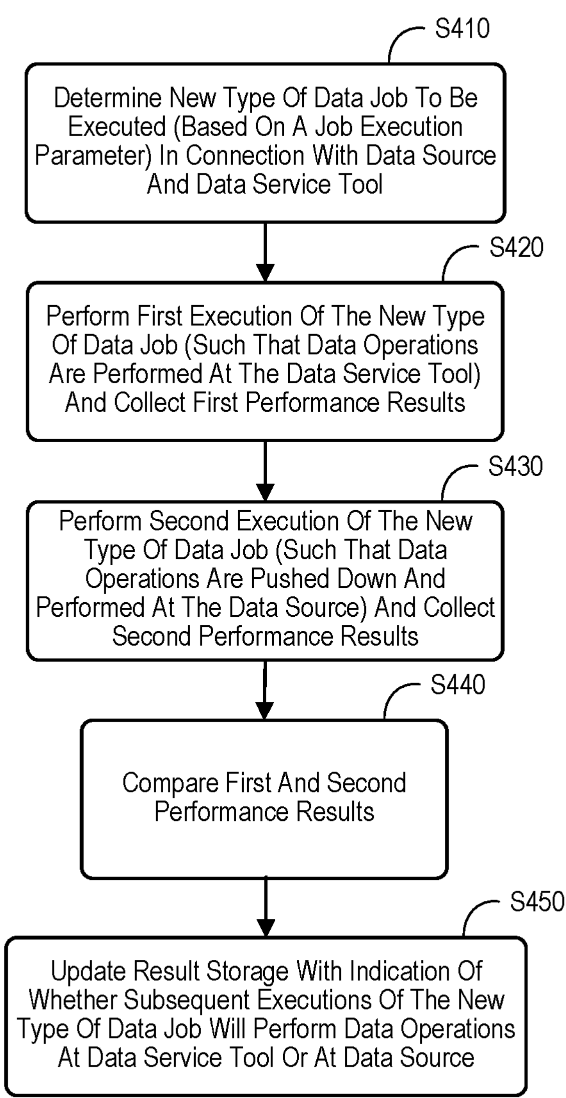
FIG. 4 is a performance optimization method according to some embodiments.

FIG. 4 is a performance optimization method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, a computer processor of a performance optimizer determines a new type of data job to be executed, e.g., based on a job execution parameter, in connection with a data source and a data service tool. The data source may be associated with a database or a database-based application (e.g., an ERP application). The data service tool may be associated with, for example, an ETL tool or a special table object (such as an SAP® pool or cluster table) that contains data from several different database tables.

At S420, a first execution of the new type of data job is performed such that data operations are performed at the data service tool. The data operations might be associated with, for example, a sort, a search, a replace, an arithmetic operation, a data join, etc. Moreover, first performance results are collected.

At S430, a second execution of the new type of data job is performed such that data operations are pushed down and performed at the data source. In addition, second performance results are collected. The first and second performance results may be associated with, for example, an execution time, Central Processing Unit ("CPU") usage, memory utilization, an Input Output ("IO") parameter, etc.

At S440, the first and second performance results are compared. At S450, a result storage is updated with an indication of whether subsequent executions of the new type of data job will perform data operations at the data service tool or at the data source. The indication might, for example, be stored in the result storage as a "pushdown flag." In this case, the result storage can be accessed prior to execution of a subsequent data job of the same type and data operations may be performed in accordance with the appropriate pushdown flag (e.g., at the data service tool or at the data source). According to some embodiments, the appropriate pushdown flag is based at least in part on the type of data job, a particular data source, a particular data service tool, and/or a type of information being accessed. Note that the result storage might be associated with a table, a pushdown flag in a file, or any other type of data storage.

Figure 5:
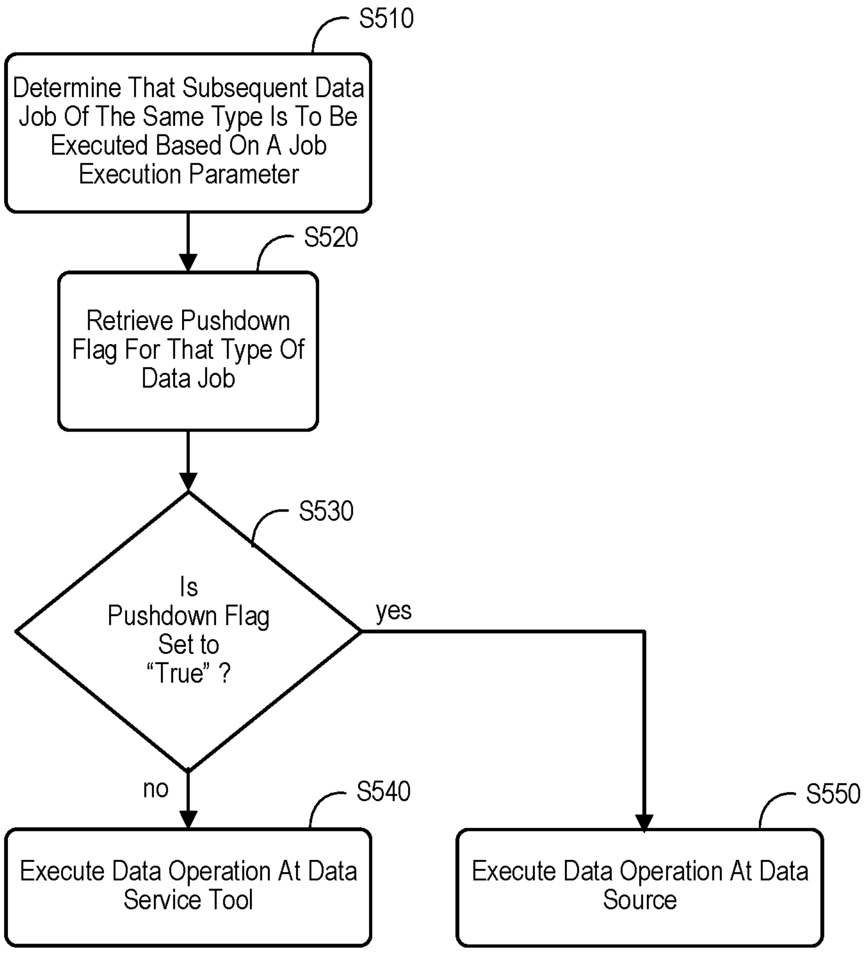
FIG. 5 is a job execution method in accordance with some embodiments.

FIG. 5 is a job execution method in accordance with some embodiments. At S510, it is determined that a subsequent data job of the same type (e.g., the same type as was evaluated in FIG. 4) is to be executed. At S520, the appropriate pushdown flag for a data job of that type is retrieved from the result storage. If the pushdown flag is false at S530, then the job is executed with the data operation running at the data service tool at S540. If the pushdown flag is true at S530, then the job is executed with the data operation running at the data source at S550.

Figure 6:
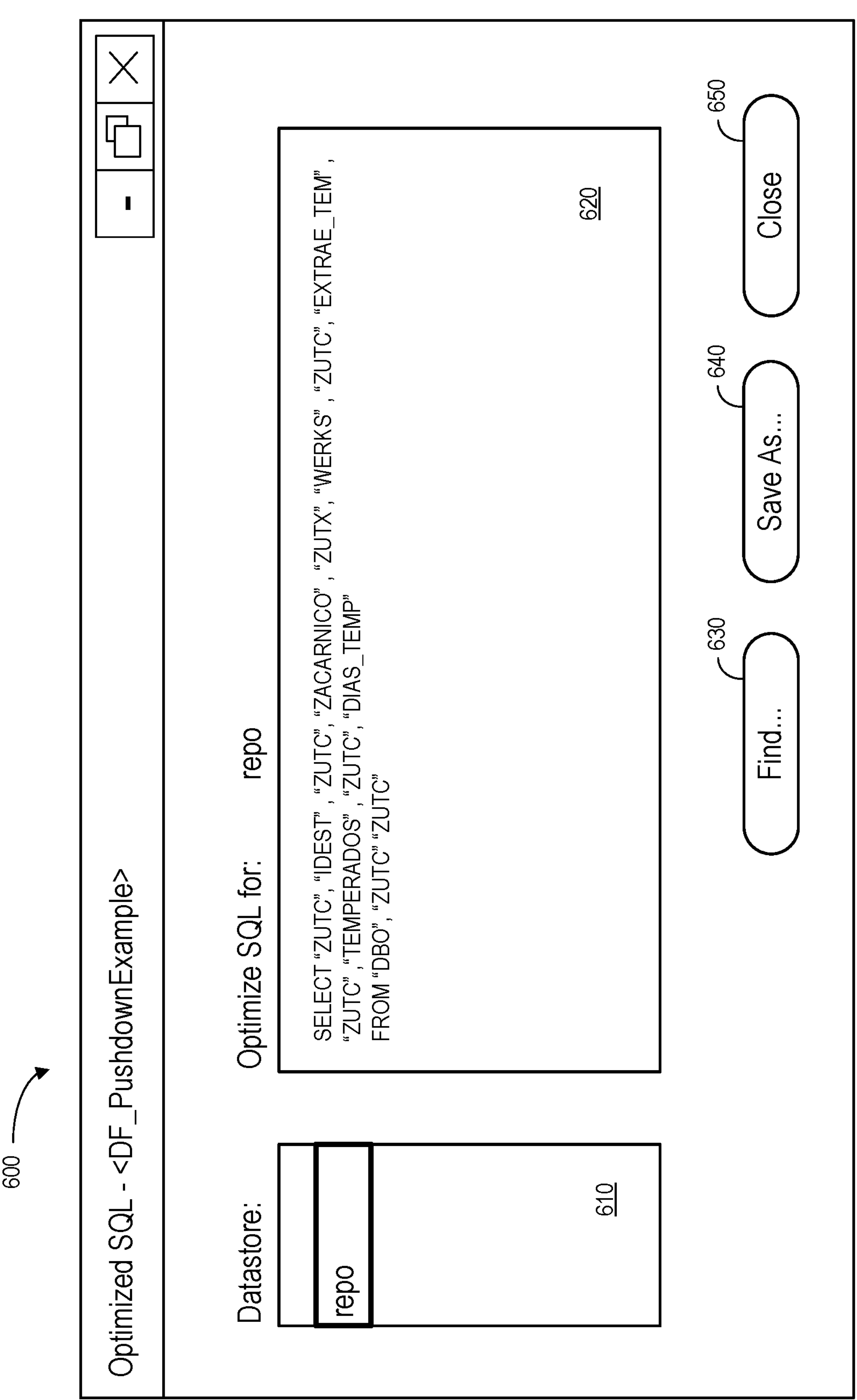
FIG. 6 illustrates a data job with data operations performed at a data service tool (without pushdown) according to some embodiments.
Figure 7:
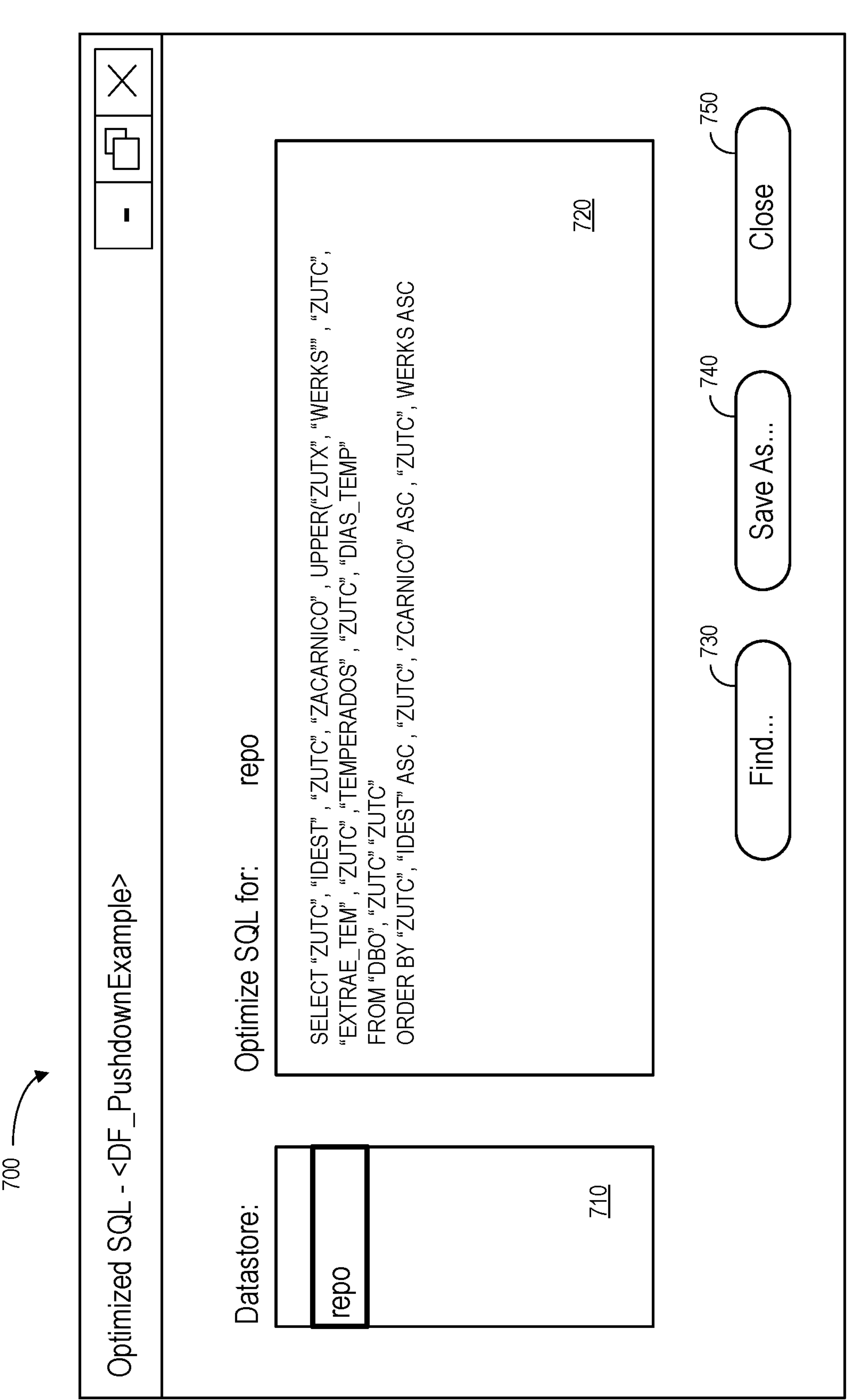
FIG. 7 illustrates a data job with data operations being pushed down to a data source in accordance with some embodiments.

A sample implementation for determination of whether or not the pushdown to the source would result in the best job performance will now be provided. In this example, the sort operation (usually implemented by the ORDER BY clause in database systems) is used in the sample job together with the upper ( ) function to translate a character field to upper-case letters. FIG. 6 illustrates a data job with data operations performed at a data service tool (without push-down) according to some embodiments. In particular, an optimized SQL interface may be used to define a datastore ("repo") 610 along with information about the data operation 620. Icons for "Find" 630, "Save As" 640 and "Close" 650 may be selectable by the user. This is how the SQL sent to the source looks when there is no pushdown and both a sort and an upper ( ) operation are performed by the data service tool (e.g., an ETL engine). FIG. 7 illustrates a data job with data operations performed at a source (with push-down) according to some embodiments. In particular, an optimized SQL interface may be used to define a datastore ("repo") 710 along with information about the data operation 720. Icons for "Find" 730, "Save As" 740 and "Close" 750 may be selectable by the user. This is how the SQL being sent to the source looks when there is a pushdown and both a sort and an upper ( ) operation are performed by the data source.

Figure 8:
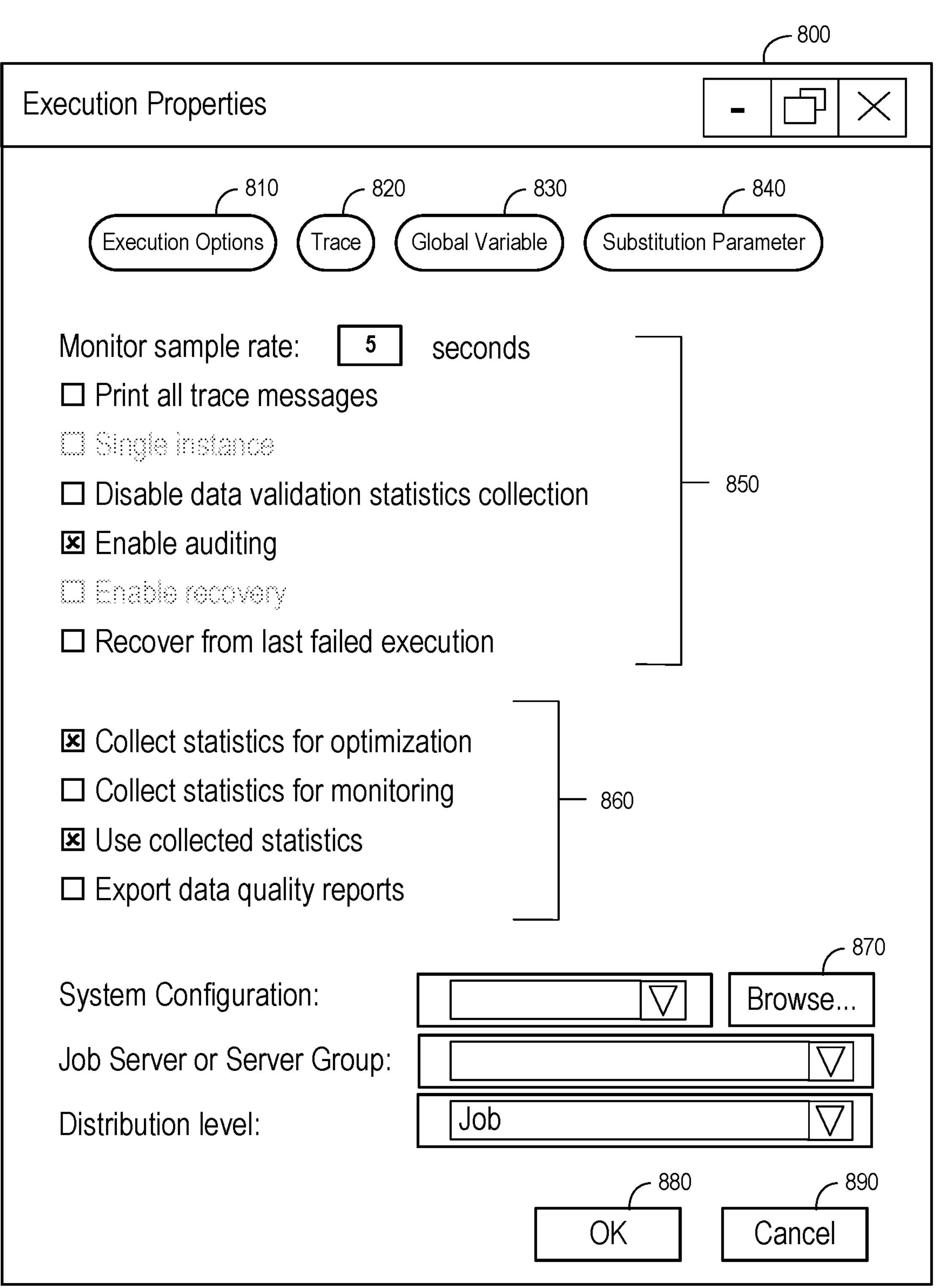
FIG. 8 illustrates execution properties according to some embodiments.

FIG. 8 illustrates execution properties 800 according to some embodiments. The execution properties 800 may include navigation icons for "Execute Options" 810, "Trace" 820, "Global Variable" 830 and "Substitution Parameter" 840 which are selectable by the user. A first user entry area 850 includes options for the user to specify a sampling rate, disable data validation statistics collection, enable auditing, etc. A second user entry area 860 includes options for the user to collect statistics for optimization, collect statistics for monitoring, use collected statistics, export data quality reports, etc. A third user entry area 870 may bused to indicate a system configuration, a job server or server group, a distribution level, etc. Icons for "OK" 880 and "Cancel" 890 may be selectable by the user. When running the job, specifying statistics collection (in the second user entry area 860) may cause the job to try both methods (processing by either the source or ETL engine) and determine the best method. The results may be stored in the repository such that all other jobs that use the same source will benefit from the comparison.

Figure 9:
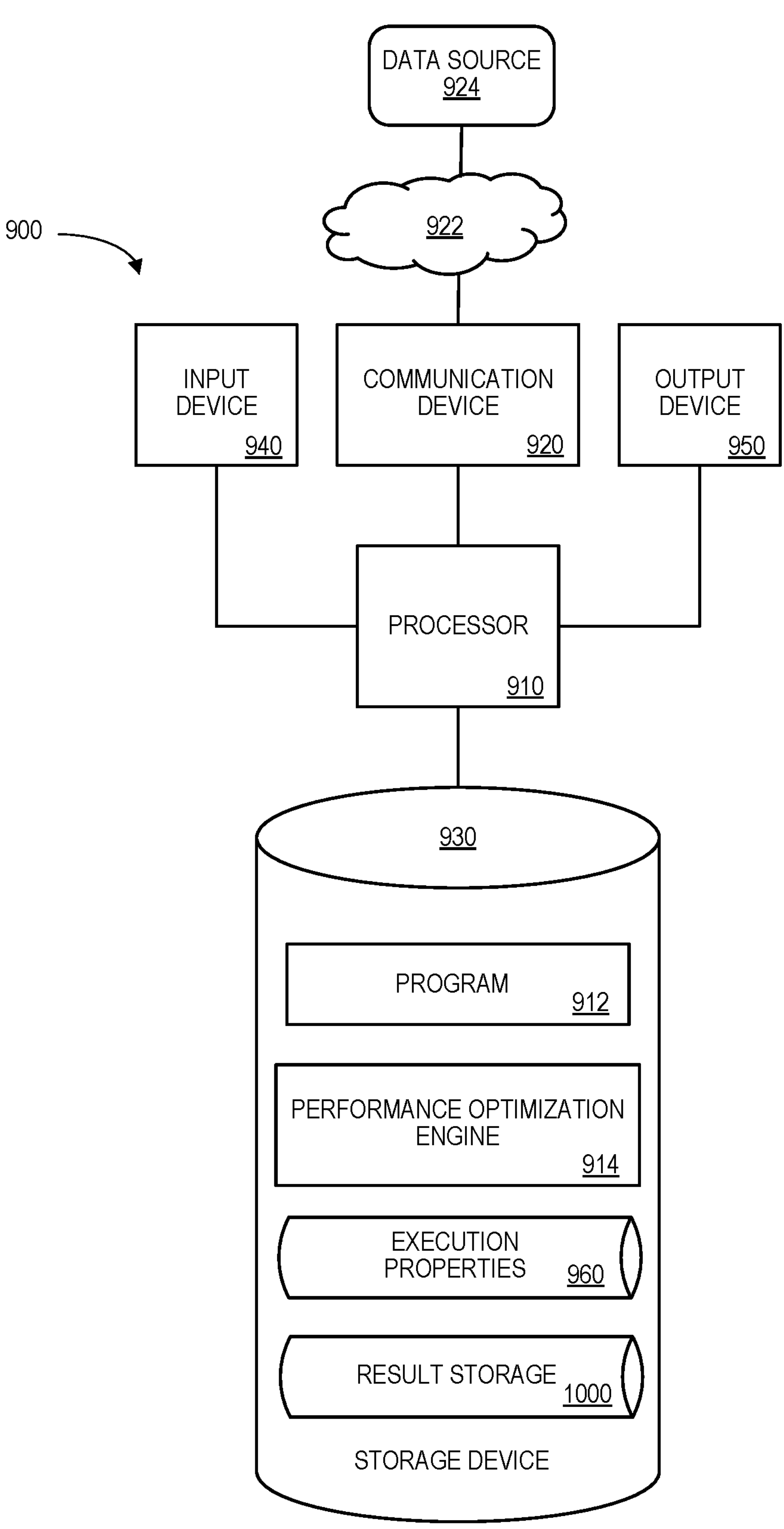
FIG. 9 is an apparatus in accordance with some embodiments.

Note that the embodiments described herein may be implemented using any number of different hardware configurations. For example, FIG. 9 is a block diagram of an apparatus or platform 900 that may be, for example, associated with the system 300 of FIG. 3 (and/or any other system described herein). The platform 900 comprises a processor 910, such as one or more commercially available CPUs in the form of one-chip microprocessors, coupled to a communication device 920 configured to communicate via a communication network (not shown in FIG. 9). The communication device 920 may be used to communicate, for example, with one or more data sources 924 via a communication network 922. The platform 900 further includes an input device 940 (e.g., a computer mouse and/or keyboard to input data about execution properties) and an output device 950 (e.g., a computer monitor to render a display, transmit recommendations or alerts, and/or create monitoring reports). According to some embodiments, a mobile device and/or PC may be used to exchange data with the platform 900.

The processor 910 also communicates with a storage device 930. The storage device 930 can be implemented as a single database, or the different components of the storage device 930 can be distributed using multiple databases (that is, different deployment data storage options are possible). The storage device 930 may comprise any appropriate data storage device, including combinations of magnetic storage devices (e.g., a hard disk drive), optical storage devices, mobile telephones, and/or semiconductor memory devices. The storage device 930 stores a program 912 and/or performance optimization engine 914 for controlling the processor 910. The processor 910 performs instructions of the programs 912, 914, and thereby operates in accordance with any of the embodiments described herein. For example, the processor 910 may communicate with the data source 924 and a data service tool. The processor 910 may determine a new type of data job to be executed based on a job execution parameter, perform a first execution of the new type of data job (such that data operations are performed at the data service tool), and collect first performance results. The processor 910 then performs a second execution of the new type of data job (such that data operations are pushed down and performed at the data source) and collects second performance results. The first and second performance results are compared by the processor 910, and a result storage 1000 is updated with an indication of whether subsequent executions of the new type of data job will perform data operations at the data service tool or at the data source 924. The indication stored in the result storage 1000 may comprise, for example, a pushdown flag.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, data may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores execution properties 960 and result storage 1000. An example of a database that may be used in connection with the platform 900 will now be described in detail with respect to FIG. 10. Note that the database described herein is only one example, and additional and/or different data may be stored therein. Moreover, various databases or data stores may be split or combined in accordance with any of the embodiments described herein.

Figure 10:
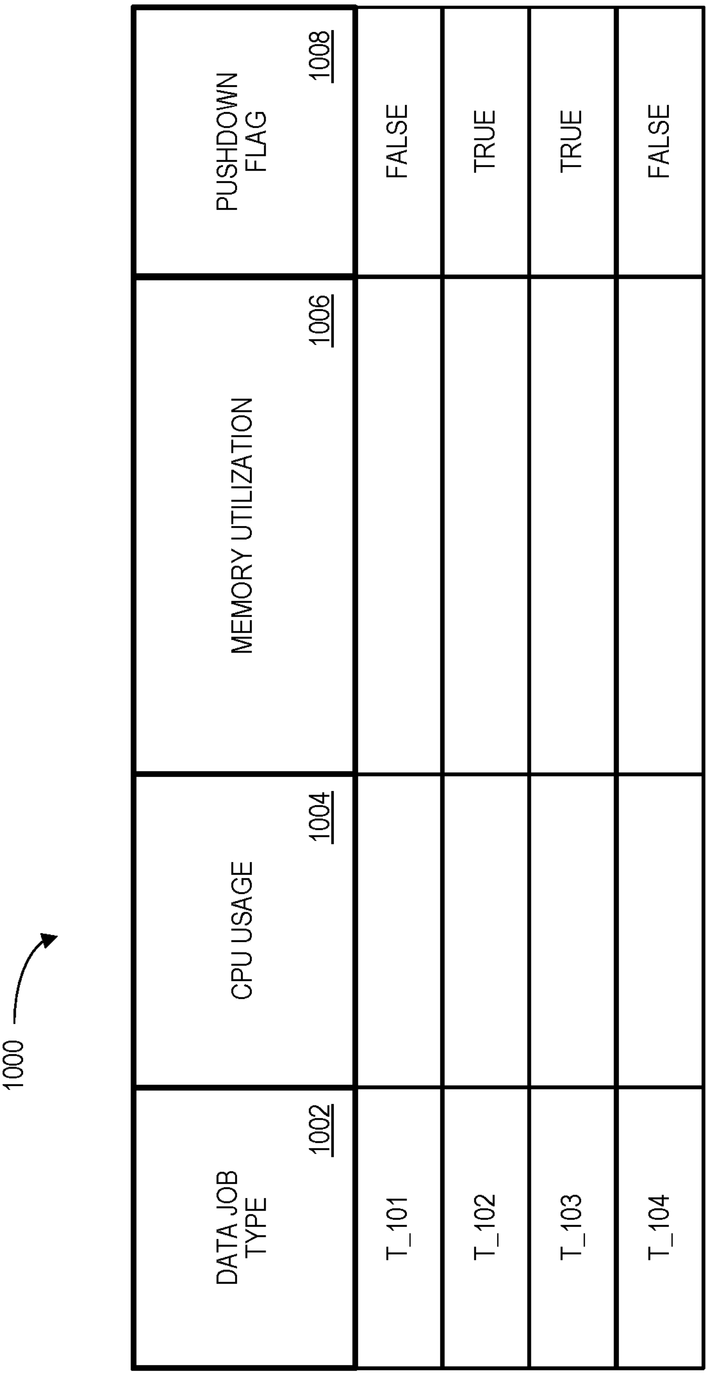
FIG. 10 is a portion of a tabular result storage according to some embodiments.

Referring to FIG. 10, a table is shown that represents the result storage 1000 that may be stored at the platform 900 according to some embodiments. The result storage 1000 may include, for example, entries identifying different types to data jobs. The result storage 1000 may also define fields 1002, 1004, 1006, 1008 for each of the entries. The fields 1002, 1004, 1006, 1008 may, according to some embodiments, specify: a data job type 1002, CPU usage 1004, memory utilization 1006, and a pushdown flag 1008. The result storage 1000 may be created and updated, for example, when a new type of data job is added, execution results are collected and/or updated, etc.

The data job type 1002 may comprise, for example, a unique alphanumeric label or link that is associated with a type of data job that might be executed. For example, an ETL tool might execute a data job to access information from a data source. The CPU usage 1004 and memory utilization 1006 might reflect how efficiently the data job was performed during two benchmark tests (one test executing a data operation at a data service tool and the other executing that same data operation at a data source). The pushdown flag 1008 might indicate whether or not this data operation should be pushed down from the data service tool to the data source in the future.

Figure 11:
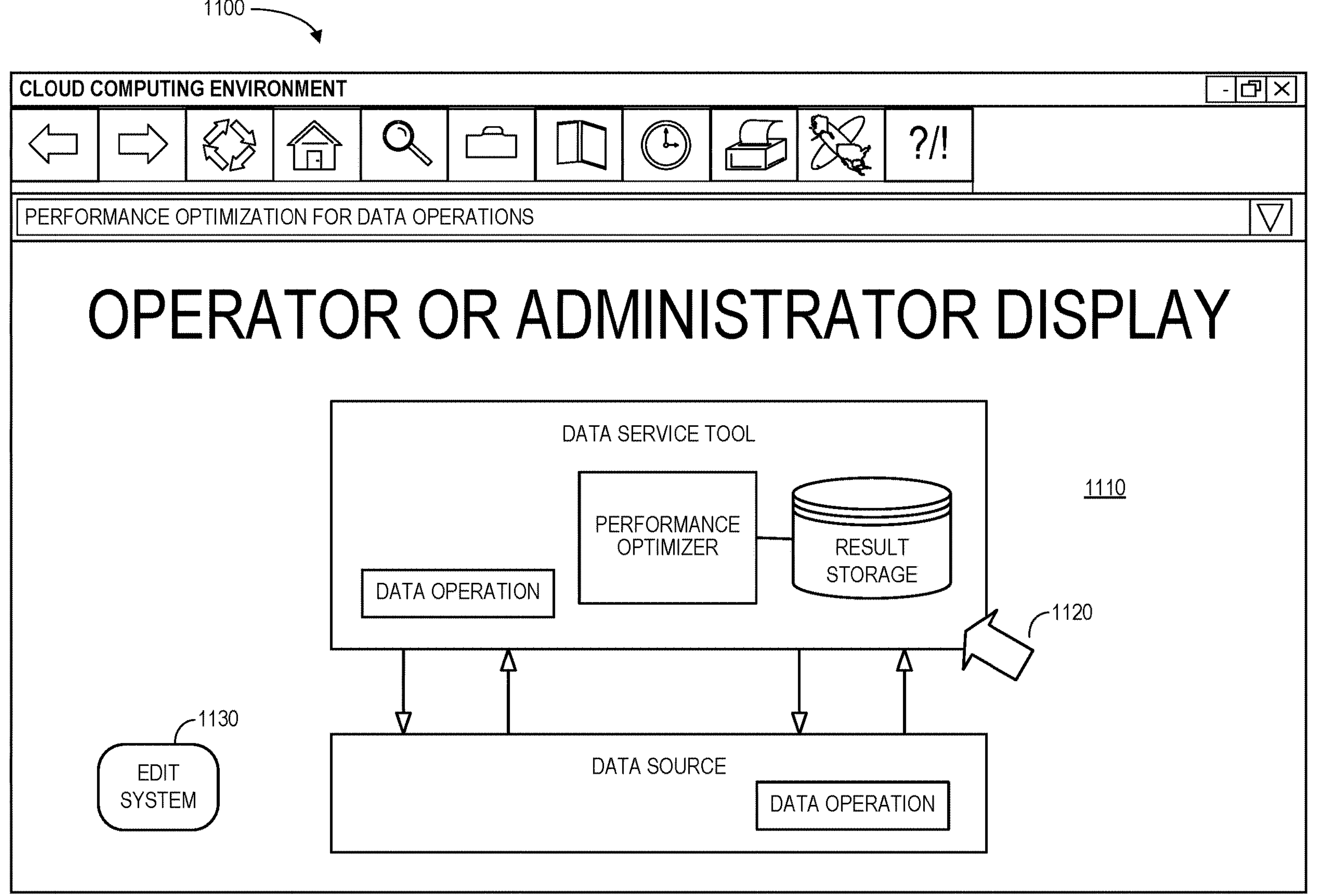
FIG. 11 is an example of an operator or administrator display according to some embodiments.

FIG. 11 is an example of an operator or administrator display according to some embodiments. The display 1100 includes a graphical representation 1110 or dashboard that might be used to manage or monitor performance optimization (e.g., associated with execution of data jobs). In particular, selection of an element (e.g., via a touchscreen or computer mouse pointer 1120) might result in the display of a popup window that contains configuration data. The display 1100 may also include a user selectable "Edit System" icon 1130 to request system changes (e.g., to investigate or improve optimization rules or logic, to change a data source mapping parameter, etc.).

Thus, embodiments may help ger improved data job performance. Moreover, there is no need to generate test data because the benchmarking can be done with real table data.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications with modifications and alterations limited only by the spirit and scope of the appended claims.

Figure 12:
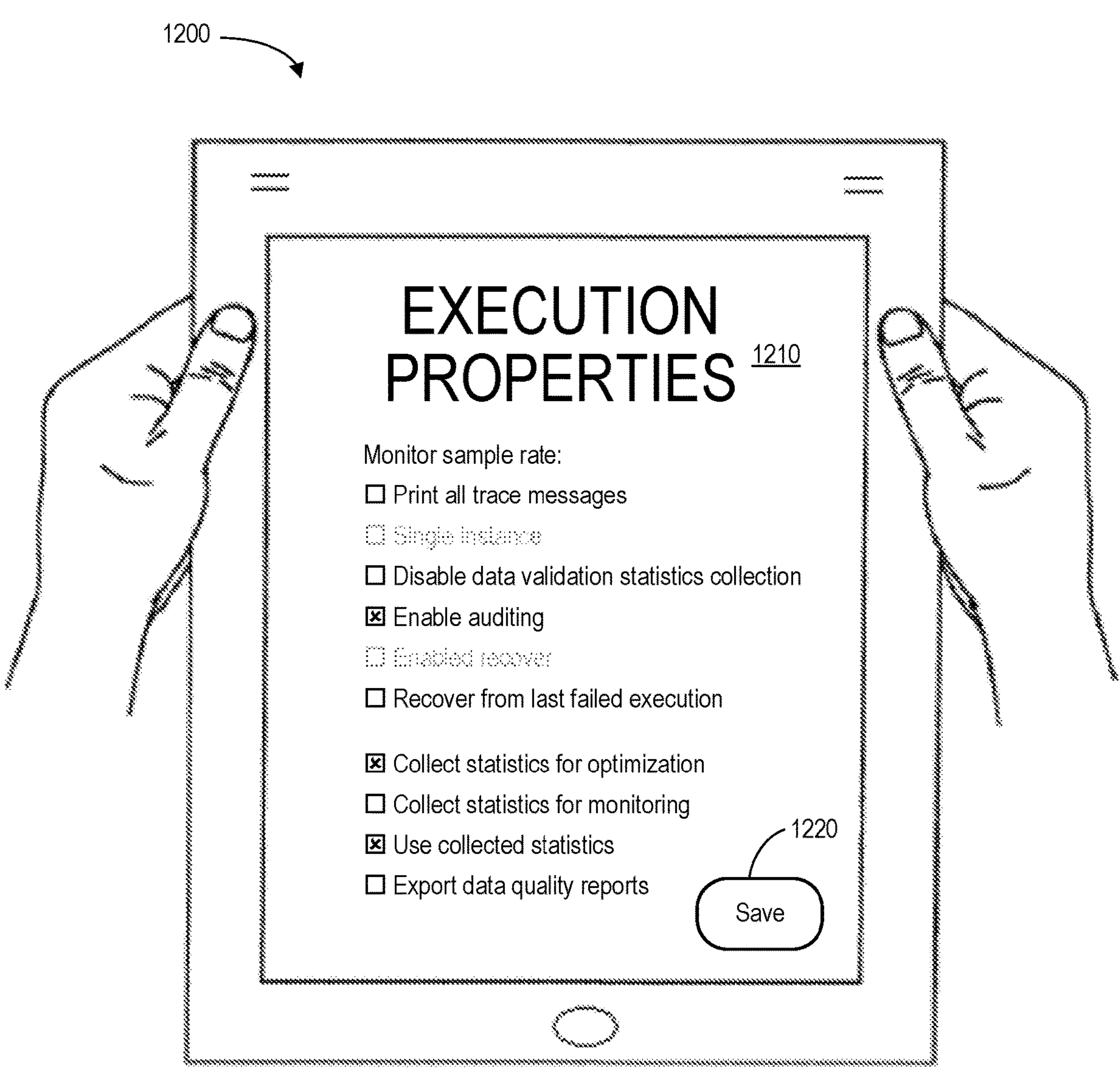
FIG. 12 is a tablet computer showing an execution properties display in accordance with some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of data operations, any of the embodiments described herein could be applied to other types of data operation. Moreover, the displays shown herein are provided only as examples, and any other type of user interface could be implemented. For example, FIG. 12 shows a handheld tablet computer 1200 rendering an execution properties display 1210 that may be used to help a user establish optimization parameters (e.g., setting statistics collection settings via a "Save" icon 1220).

What is claimed is:

1. A system, comprising:

a data source;

a data service tool;

a result storage; and a performance optimizer coupled to the data source, the data service tool, and the result storage, including:

a computer processor, and a computer memory coupled to the computer processor and storing instructions that, when executed by the computer processor, cause the performance optimizer to:

determine a new type of data job to be executed based on a job execution parameter, perform a first execution of the new type of data job, such that data operations are performed at the data service tool, and collect first performance results, perform a second execution of the new type of data job, such that data operations are pushed down and performed at the data source, and collect second performance results, compare the first and second performance results, update the result storage with a pushdown flag comprising an indication of whether subsequent executions of the new type of data job will perform data operations at the data service tool or at the data source, and in response to receiving a subsequent request for the new type of data job to be executed on a particular job execution parameter, perform a subsequent execution of the new type of data job such that the data operations are performed at the data service tool or are pushed down and performed at the data source, based on the pushdown flag in the result storage.

2. The system of claim 1, wherein the data source is associated with at least one of: (i) a database, and (ii) a database-based application.

3. The system of claim 1, wherein the data service tool is associated with a special table object that contains data from several different database tables.

4. The system of claim 1, wherein the data operations are associated with at least one of: (i) a sort, (ii) a search, (iii) a replace, (iv) an arithmetic operation, and (v) a data join.

5. The system of claim 1, wherein the first and second performance results are associated with at least one of: (i) an execution time, (ii) Central Processing Unit ("CPU") usage, (iii) memory utilization, and (iv) an Input Output ("IO") parameter.

6. The system of claim 1, wherein the appropriate pushdown flag is based at least in part on: (i) the type of data job, (ii) a particular data source, (iii) a particular data service tool, and (iv) a type of information being accessed.

7. A method, comprising:

determining, by a computer processor of a performance optimizer, a new type of data job to be executed, based on a job execution parameter, in connection with a data source and a data service tool;

performing a first execution of the new type of data job, such that data operations are performed at the data service tool, and collecting first performance results;

performing a second execution of the new type of data job, such that data operations are pushed down and performed at the data source, and collecting second performance results;

comparing the first and second performance results;

updating a result storage with a pushdown flag comprising an indication of whether subsequent executions of the new type of data job will perform data operations at the data service tool or at the data source; and in response to receiving a subsequent request for the new type of data job to be executed on a particular job execution parameter, performing a subsequent execution of the new type of data job such that the data operations are performed at the data service tool or are pushed down and performed at the data source, based on the pushdown flag in the result storage.

8. The method of claim 7, wherein the data source is associated with at least one of: (i) a database, and (ii) a database-based application.

9. The method of claim 7, wherein the data service tool is associated with a special table object that contains data from several different database tables.

10. The method of claim 7, wherein the data operations are associated with at least one of: (i) a sort, (ii) a search, (iii) a replace, (iv) an arithmetic operation, and (v) a data join.

11. The method of claim 7, wherein the first and second performance results are associated with at least one of: (i) an execution time, (ii) Central Processing Unit ("CPU") usage, (iii) memory utilization, and (iv) an Input Output ("IO") parameter.

12. The method of claim 7, wherein the appropriate pushdown flag is based at least in part on: (i) the type of data job, (ii) a particular data source, (iii) a particular data service tool, and (iv) a type of information being accessed.

13. A non-transitory, machine-readable medium comprising instructions thereon that, when executed by a processor, cause the processor to execute operations to perform a method, the method comprising:

determining, by a computer processor of a performance optimizer, a new type of data job to be executed, based on a job execution parameter, in connection with a data source and a data service tool;

performing a first execution of the new type of data job, such that data operations are performed at the data service tool, and collecting first performance results;

performing a second execution of the new type of data job, such that data operations are pushed down and performed at the data source, and collecting second performance results;

comparing the first and second performance results;

updating a result storage with a pushdown flag comprising an indication of whether subsequent executions of the new type of data job will perform data operations at the data service tool or at the data source; and in response to receiving a subsequent request for the new type of data job to be executed on a particular job execution parameter, performing a subsequent execution of the new type of data job such that the data operations are performed at the data service tool or are pushed down and performed at the data source, based on the pushdown flag in the result storage.

14. The medium of claim 13, wherein the data source is associated with at least one of: (i) a database, and (ii) a database-based application.

15. The medium of claim 13, wherein the data service tool is associated with a special table object that contains data from several different database tables.

16. The medium of claim 13, wherein the data operations are associated with at least one of: (i) a sort, (ii) a search, (iii) a replace, (iv) an arithmetic operation, and (v) a data join.

17. The medium of claim 13, wherein the first and second performance results are associated with at least one of: (i) an execution time, (ii) Central Processing Unit (“CPU”) usage, (iii) memory utilization, and (iv) an Input Output (“IO”) parameter.

* * * * *